United States Patent [19]

Cabasso et al.

[11] Patent Number: 4,954,381
[45] Date of Patent: Sep. 4, 1990

[54] PREPARATION OF POROUS SUBSTRATES HAVING WELL DEFINED MORPHOLOGY

[75] Inventors: Israel Cabasso, Syracuse, N.Y.; Moshe Levy, Rehovot, Israel

[73] Assignee: The Research Foundation of the State University of New York, Albany, N.Y.

[21] Appl. No.: 171,497

[22] Filed: Mar. 21, 1988

Related U.S. Application Data

[63] Continuation of Ser. No. 947,929, Dec. 30, 1986, abandoned.

[51] Int. Cl.$^5$ .................... B01J 13/02; B29D 7/00; B32B 3/12
[52] U.S. Cl. .................... 428/116; 260/DIG. 31; 264/4.6; 264/216; 424/DIG. 7; 428/402.21; 428/402.22; 514/963
[58] Field of Search ................ 264/4.6, 216; 428/402.21, 402.22, 116; 424/DIG. 7; 260/DIG. 31; 427/245, 246; 210/500.21, 500.22

[56] References Cited

U.S. PATENT DOCUMENTS

| | | | |
|---|---|---|---|
| 3,377,190 | 4/1968 | Baguley | 427/245 X |
| 3,460,972 | 8/1969 | Nack | 428/402.24 |
| 3,567,118 | 3/1971 | Shepherd et al. | 239/6 |
| 4,064,294 | 12/1977 | Babil et al. | 427/372 |
| 4,177,256 | 12/1979 | Michaels et al. | 424/427 |
| 4,269,713 | 5/1981 | Yamashita et al. | 210/500.2 |
| 4,402,940 | 9/1983 | Nose et al. | 424/101 |

OTHER PUBLICATIONS

Chem. Abstr. 100(6) 122365b.
Chem. Abstr. 101(10) 73901h.
Chem. Abstr. 81(24) 153976v.
Chem. Abstr. 86(10) 56460t.
Chem. Abstr. 90(20) 153176v.
Chem. Abstr. 90(26) 205417w.

*Primary Examiner*—Richard D. Lovering
*Attorney, Agent, or Firm*—Morgan & Finnegan

[57] ABSTRACT

A membrane of defined pore structure and controlled pore diameter and a method of preparing the membrane which comprises dispersing in a water soluble polymer solution (A) an organic polymer solution (B), the water-soluble polymer solution (A) being a non-solvent for the polymer solution (B), to form micro-spherical droplets of the polymer solution (A) which are enveloped by a solid phase consisting of a coagulated or cross-linked polymer solution (B); evenly casting the dispersion on a flat surface; and evaporating the solvent for the polymer solution (B) to form a microporous membrane comprised of the polymer (B), the porosity, pore size, and void volume of the microporous membrane being a function of the polymer (A) concentration, the microsphere dimensions and the temperature and evaporation rate. The water-soluble polymer (A) is selected from polyethyleneimine, gelatin, polyvinyl-pyrrolidone, polyvinyl pyridinium halide, polyacrylic acid, polyhydroxyethylmethacrylate (HEMA), dextran, or polyvinyl acetate. The continuous phase polymer (B) is selected from a brominated polyphenylene oxide, polyphenylene oxide, polyacetic acid, polystyrene, polyglycol acrylate (PGA), polymethylmethacrylate, cellulose acetate, polyvinyl acetate, polycarbonate and polyvinylidene fluoride.

21 Claims, 2 Drawing Sheets

PREPARATION OF POROUS SUBSTRATES HAVING WELL DEFINED MORPHOLOGY

This is a continuation of co-pending application Ser. No. 06/947,929 filed Dec. 30, 1986, now abandoned.

BACKGROUND OF THE INVENTION

1. Field of the Invention

The present invention relates to a porous membrane having a continuous pore structure with a narrow range of pore diameters and no overlapping pores and methods of preparing the porous membrane.

2. Description of Art

Porous membranes have been developed for filtration, ultrafiltration, and other purposes. Almost all the methods capitalize on the phase-inversion mechanism by which a polymer solution is cast (or spun) and thereafter a controlled coagulation process is applied to yield a web-like structure or porous-skin resting on an open cell foam-like structure. Surface pores of such membranes usually exhibit a wide size distribution which can range from 5 nanometers (nm) to several micrometers ($\mu$m). Attempts have been made to produce membranes having a continuous porous structure with a well defined, narrow range of pore diameters and with no overlapping pores. One such attempt produced ionotropic gel membranes. Another attempt produced Nucleopore membranes which were ion beam etched to produce pores having well defined dimension and structure. However, overlap of two or more pores always occurred in the latter methods.

In Chem. Abstr. 100(6), 122365b, there is described a porous film membrane made by irradiating a high molecular weight polycarbonate, polyethylene terephthalate, or cellulose nitrate membrane with accelerated charged particles such as accelerated nitrogen ions, etching the membrane with NaOH or $NHO_3$, and thereby forming pores of homogeneous pore diameter in the membrane. The size of the pores is controlled by changing the kind of ions being accelerated. A polycarbonate membrane is described as having a thickness of 10 microns, a homogeneous pore diameter of 1 micron and a pore density of 2 million/$cm^2$.

In Chem. Abstr. 101(10), 73901h, there is described a polysulfone porous membrane formed by dissolving more than 5% of a polysulfone resin in trichloroethylene or dimethylformamide, adding methanol or n-hexane to the solution, molding the solution onto a film, and coagulating the molding in a coagulation bath which includes water and/or water-miscible organic liquids, e.g., ethanol. The porous membrane has homogeneous fine pores on the surface having an average pore diameter of 100° A to 5 microns and voids of 30–90%.

In Chem. Abstr. 81 (24). 153976, there is described an acrylonitrile copolymer membrane having uniform fine pores. The membrane is made by extruding an acrylonitrile copolymer solution through a ring die and coagulating with aqueous solutions of different coagulation numbers from inside and outside the tubular film in such a way that at least one of the coagulation solutions has a coagulation number greater than 15.

In Chem. Abstr. 86 (10), 56460t, there is described a porous polymer film of uniform pore size which is produced by pouring a Polymer solution containing a polymer emulsion of 0.05 to 5 microns uniform particle size thereon, wherein the polymer emulsion is produced by seed-polymerization of styrene, vinyltoluene, alphamethylstyrene, or vinyl chloride; contacting the film with a solvent capable of dissolving the polymer emulsion, but not the film, to produce a porous polymer film, the solvent being toluene, propanol, benzene or ethylalcohol.

In Chem. Abstr. 90(20), 153176v, there are described fine porous aromatic polyamide membranes prepared by extruding aromatic polyamides such as polyparaphenylene terephthalamide and polyparabenzamide which have been dissolved in solvents (e g., $H_2SO_4$) in the form of film, and orienting the films monoaxially, introducing the films into a coagulation bath containing more than 50% of polymer solvents held below 0° C., and biaxially orienting the films.

In Chem. Abstr., 90(26), 205417w, there is described an ultrafiltration membrane produced from the condensation product of dichloro or diphenyl sulfone and bisphenol, using a non-volatile solvent able to dissolve the condensation product, a $C_2$–$C_4$ polyalcohol and/or water as a solvent. The non-volatile solvent is one or more of m-cresol, chlorobenzene, N,N-dimethyl acetamide and N,N-dimethyl formamide, and the polyalcohol is one or more of ethylene glycol, propylene glycol glycerin and butane diol. The membrane has an unsymmetrical structure with a surface layer having uniform pores and high water permeability.

SUMMARY OF THE INVENTION

1. Brief Description of the Invention

The present invention concerns a porous membrane having a well defined microporous structure with a narrow distribution of pore diameters and no overlap of pores and methods of making same. The membranes are prepared by evenly casting on a substrate, a water-soluble polymer solution (A) dispersed in an organic polymer solution (B) forming a multiplicity of micro-spherical droplets of the polymer solution (A) enveloped by a solid phase consisting of the coagulated or cross-linked polymer (B) and then evaporating the microspherical droplets to form the microporous membrane. The porosity, pore size and void volume obtained is a function of the concentration of the polymer (A), the dimensions of the microspheres and the temperature and evaporation rate.

Dispersions can be prepared by mixing two nonmiscible solutions. In order for these dispersions to remain stable for a usable period, surface active agents are usually added. Their function is to lower the total free energy of mixing, thus prolonging the lifetime of the dispersion. Such dispersions are similar to an oil in water (o/w) emulsion or a water in oil (w/o) emulsion, depending on the relative amounts of the two phases. When such dispersions are cast and the solvent for the dispersed phase is allowed to evaporate, various porous substrates displaying unique morphologies can be obtained:

In one embodiment, spherical droplets of 0.1–3000 micrometers ($\mu$m) size of a polymer solution (A) are encapsulated in a membrane compound of polymer (B). These droplets may comprise a solvent and a solute consisting of a macromolecule, or a small molecule, or both. By proper choice of a polymer (B), the membrane can be used for encapsulation and slow release purposes.

When the solvent for the dispersed phase is evaporated, e.g. by exposure to air or by heating at elevated temperatures, the droplets burst. This leaves holes of well-defined pore diameters. In this manner, a membrane suitable for ultrafiltration may be made.

In another embodiment, an anisotropic asymmetric membrane is formed by encapsulating the spherical droplets of polymer solution (A) in a polymer (B) solution to form an emulsion, and rapidly evaporating the top layer of the emulsion, e.g., by exposing the top layer to differential pressure provided by passing air across the surface of the top layer, yielding a "skin" layer with a very well defined and relatively uniform pore diameter, backed by a porous and thicker inner layer. Such membrane is suitable for ultrafiltration or reverse osmosis.

In another embodiment, by introducing two polymers (A and B) that will interact with each other at their interface, a complex membrane results which is actually composed of a polymer A, dispersed in a polymer B, and a complex, AB, at the interface between two polymers. The composite structure will have properties different from those of either polymer A or polymer B.

2. BRIEF DESCRIPTION OF THE DRAWINGS

Figure 1:
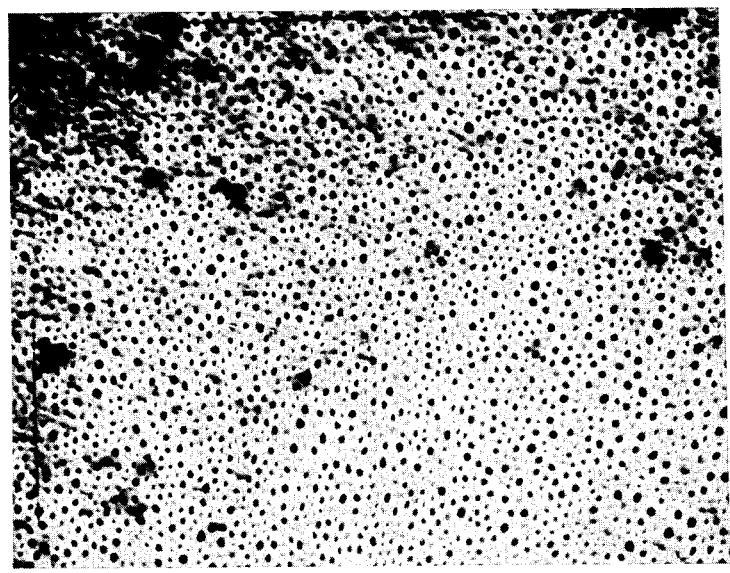
FIG. 1 is a scanning electron microscope (SEM) micrograph taken at 500 magnification showing the top microporous surface of a polyethyleneimine -polydimethylphenylene oxide membrane prepared according to a method of this invention.
Figure 3:
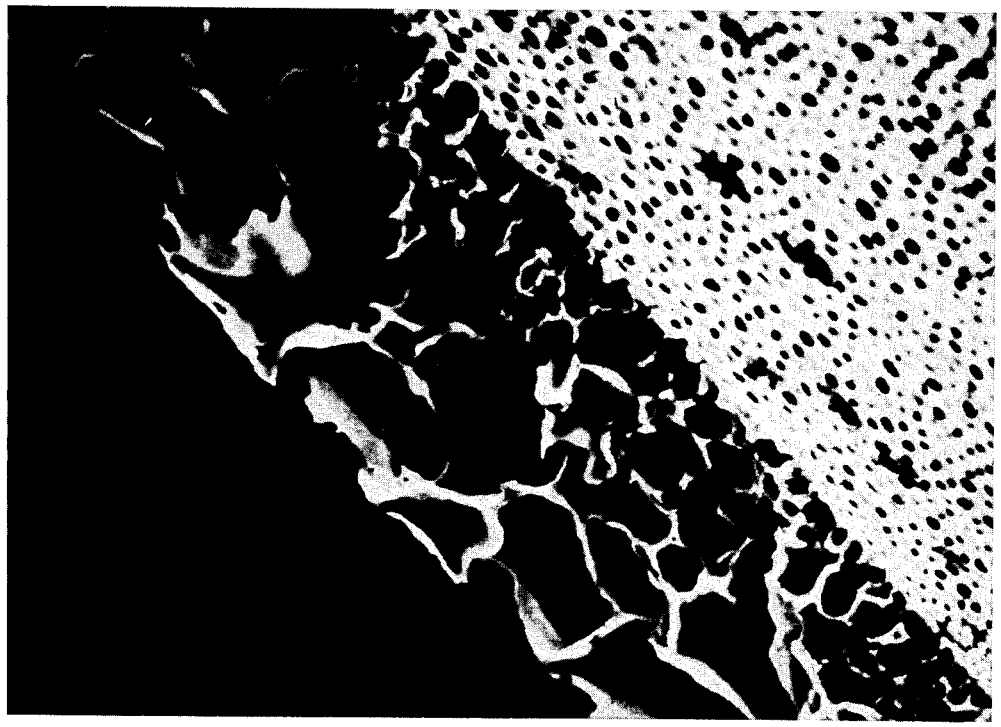

FIG. 3 is a SEM micrograph taken at 1,000 magnification showing both a cross-section and the microporous top surface of the membrane of FIG. 1. The microporous top surface is designated as A and the cross-sectional view of the body of the membrane is designated as B on the micrograph. As can be seen from FIG. 3, the membrane has a porous unisotropic structure. The top surface (skin) of the membrane designated as A on FIG. 3, has micropores therein of essentially uniform size and distribution which do not overlap. The body of the membrane, designated as B on FIG. 3, is porous and extends throughout the entire thickness of the membrane.

Figure 4:
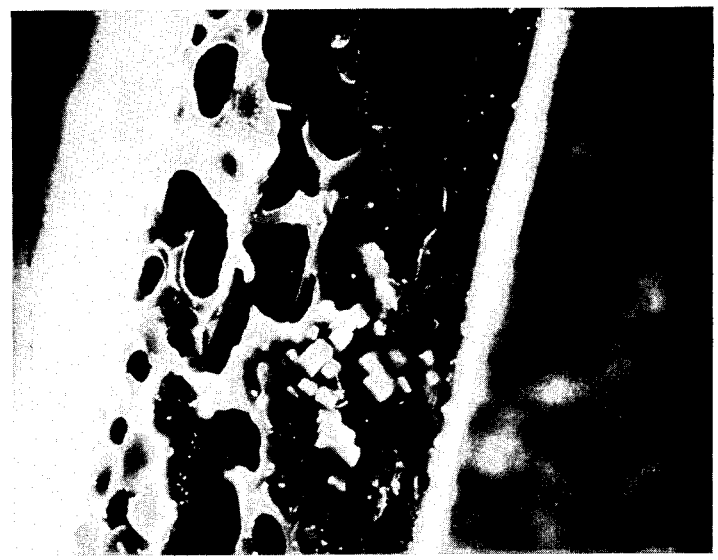

FIG. 4 is another SEM micrograph taken at 1,000 magnification showing a cross-section of a membrane similar to that of FIG. 1 but prepared with an aqueous salt solution. The salt crystals entrapped in the membrane can be seen as generally rectangularly shaped pieces on the micrograph and are control released into an aqueous medium once the membrane is submerged therein.

3. DETAILED DESCRIPTION OF THE INVENTION

In one aspect, this invention relates to a method of making a microporous membrane having a preselected pore structure, the diameters of the pores being within a preselected range, the method comprising:

a. providing a solution of polymer (A) in an organic solvent, said polymer (A) having a least about 5% by weight of one or more water-soluble groups on its polymer chain and containing one or more functional groups capable of reacting complexing or polymerizing with polymer (B);

b. providing a solution of polymer (B) in an aqueous solution which is immiscible in said organic polymer (A) solution, said polymer (B) containing at least 5% by weight of at least one functional group which can react, complex or polymerize with the functional group of polymer (A), or, said polymer (B) is capable of coagulating in the presence of polymer (A);

c. uniformly dispersing the organic polymer (B) solution in the water-soluble polymer (A) solution to form a multiplicity of micro-spherical droplets of the polymer (A) solution enveloped by a skin composed of the product of reaction of polymers (A) and (B) or the coagulated polymer (B), said polymer (A) solution droplets being uniformly dispersed within a continuous phase comprised of said organic polymer (B) solution;

d. evaporating the organic solvent to form a honeycomb-like structure comprised of said micro-spherical droplets uniformly dispersed within and held together by a solid continuous phase of said polymer (B); and f. dehydrating the honeycomb-like structure which cracks the exposed surfaces of the micro-spherical droplets and forms the microporous membrane comprised of a solid continuous phase of polymer (B) having a network of pores uniformly dispersed therein, with no overlapping pores, the pores at the surface having preselected sizes between about submicrons and about 10 microns in diameter.

In one aspect of this invention, the polymer (B) comprises a polymer having functional groups in its polymer chain which can react with the functional groups of polymer (A) to form a copolymer of polymers (A) and (B). The functional groups of polymer (A) can be the same as the water-soluble groups of polymer (A), e.g., the amino group, hydroxyl groups, acid groups, etc. However, they need not be the same. For example, the functional group of polymer (A) may be an allylic group or a vinylic group. The functional groups of polymer (B) can be isocyanate (—NCO), anhydride (—COOCO), or an acid halide COX wherein X is a halide, or —OM wherein M is an alkali metal (e g., lithium, sodium, and potassium), alkylammonium of 1 to 4 carbon atoms or alkanolammonium of 1 to 4 carbon atoms. Examples of polymer (B) which contain such functional groups include methyl brominated poly(-phenyleneoxide), polyacetic acid, chloromethylated polystyrene, polyglycol acetate (PGA) and the like. In the practice of this invention, the polymer (B) reacts with and forms a copolymer with polymer (A) at their interface, the interface being the circumferential area surrounding the microspherical droplets comprising polymer (A).

In another aspect of this invention, polymer (B) may comprise a polymer which coagulates and forms a precipitate in the presence of the polymer (A) solution. Thus, in the practice of this invention, the polymer (B) will coagulate at the interface between polymer (B) and polymer (A), the circumferential area surrounding the micro-spherical droplets comprising polymer (A). Examples of polymer (B) which will coagulate in the presence of polymer (A) solution (in a water phase) include polyphenylene oxide, polystyrene, polymethylmethacrylate, cellulose acetate, polyvinyl acetate, polycarbonate and polyvinylidene fluoride, and the like.

The water-soluble polymer (A) may be selected from polyoxyisophthaloyl, polyethyleneimine, gelatin, polyvinyl-pyrrolidone, polyvinyl pyridinium halide, polyamino methylsiloxane, polyacrylic acid, polyhydroxyethylmethylacrylate (HEMA), dextran, and polyvinyl alcohol, their copolymer derivatives, and the like. These polymers have at least 5% by weight water soluble groups on their polymer chain or pendent to the backbone of the polymer. Water soluble groups may be selected from amino, hydroxy, carboxy organic acids (e.g., COOH) and quarternary salts. Other water-soluble groups believed to be suitable for this invention include sulfonic, phosphonic, phosphinic, arsenic, selenonic and telluric.

Other polymers believed to be suitable for use as the polymer (B) in this invention include derivatives of polyacrylic and polymethacrylic acids, polyacrylate esters, polymethacrylate esters, polyvinyl chloride, poly-3, 3-bis (chloromethyl) oxetane, polyvinyl fluoride, polyvinylidene-fluoride, polychlorotrifluoroethylene, poly-tetrafluoroethylene, poly (vinyl trifluoroacetate), poly (methyl vinyl carbinol), poly (vinyl alcohol), poly (vinyl hydrogen phthalate), poly (vinyl acetate), poly (vinyl chloroacetate), poly (vinyl dichloroacetate), poly (vinyl trichloroacetate), poly (vinyl dichloroacetate), poly (vinyl trichloroacetate), poly (vinylcyclohexante), poly (acenaphthalene), poly (vinyltoluene), poly (vinyl naphthalene), poly (alpha methylstyrene), polystyrene and substituted styrenes (chloro, nitro, alkyl with 1 to 20 carbons and alkoxy with 1 to 20 carbons, polyvinyl sulfide, polysulfones such as polyoxy 1, 4-phenyline and sulfonyl 1, 4-phenylene, poly (ethyl vinyl sulfone), polysulfonamide, polyepsilon caprolactone, polyethers such as polypropylene oxide, polyacetals, polyketones, polyesters (aromatic of 6 to 20 carbon atoms and aliphatic of 2 to 20 carbon atoms) such as polyethylene adipate and polyethylene terphthalate, polyvinyl butyral, polyvinyl formal, poly (vinyl ethers) such as poly-2-methoxypropylene and poly (vinyl methyl ether), poly (aryl vinyl ethers), polyphosphazines such as polydichlordi-phosphazine and polybis piperadino phosphazine, polybenzamidazoyl, poly (piperazines) poly (allyllic resins), polyphenylene oxide, polycarbonates, polyolefins such as ethylene, propylene, butane, isobutylene, 4-methylpentene-1, and copolymers, polyurethanes, polysiloxanes such as polydimethyl-siloxane and derivatives thereof, polydienes such as butadiene and isoprene, furane resins, phenolic resins and cresyllic resins and the like.

Suitable organic solvents for polymer (B) include aromatic compounds such as benzene, toluene, ethylbenzene, 1,2-dimethylbenzene, 1,3-dimethylbenzene, 1,4-dimethylbenzene, n-propylbenzene, n-butylbenzene, 1-methyl-4-ethylbenzene, 1,2,3-trimethylbenzene, 1,2,4-trimethylbenzene, 1,3,5trimethylbenzene, 1,2,3,4-tetramethylbenzene, 1,2,3,5tetramethylbenzene, 1,2,4,5-tetramethylbenzene, pentamethylbenzene, hexamethylbenzene and the like. A preferred organic solvent is toluene.

Suitable organic solvents for polymer (B) also include aryl halides such as fluorobenzene, chlorobenzene, bromobenzene, iodobenzene, fluorotoluene, chlorotoluene, bromotoluene, iodotoluene, difluorobenzene, dichlorobenzene, dibromobenzene, nitrochlorobenzene, 2,4-dinitrochlorobenzene, 2,4,6-trinitrochlorobenzene, vinyl chloride, vinyl bromide and chlorinated hydrocarbons such as methylene chloride and chloroform.

Suitable solvents for polymer (A) include water, methanol and an aqueous solution of an alcohol.

In another aspect, this invention relates to a porous polymer substrate that consists of a very well defined porous surface in which the pore dimensions are confined within a desired diameter range. All the substrates, or the related membrane derivatives, are prepared by casting (or spinning) a concentrated suspension of spherical droplets that are enveloped by coagulated, crosslinked, or nonsoluble polymer shells. Subsequent removal of the liquid components yields a beehive morphology. The membrane may be asymmetric and the skin may contain fairly uniformly sized holes that can range from 0.01 micrometer to 10 micrometers in diameter with a deviation of ±50%. The membranes can be used for reverse osmosis, ultrafiltration and microfiltration.

The membranes also can be used for slow release of drugs or other chemicals and the rate of release can be varied from minutes to days. The membranes can be made biodegradable.

Figure 2:
FIG. 2 is another SEM micrograph of the membrane of FIG. 1 taken at 2,000 magnification.

A substrate is prepared by dispersing two non-miscible liquids. One of the non-miscible liquids is a polymer solution, designated herein as A. The other non-miscible liquid is a nonsolvent for solution A, which is designated herein as B. By dispersing solution B in solution A in a manner which resembles, for example, the dispersion of water in oil to form an emulsion, spherical droplets of liquid A are formed. The polymer solution B coagulates at the interface and a boundary which envelops the droplets of liquid A is formed. The boundary consists of a solid phase of the coagulated polymer B. The dispersion then is evenly cast on a flat surface (for example, a glass plate, mercury, etc.). The polymer solution A is allowed to evaporate quickly. As a result, a very well defined assembly of hollow nodules is formed. The nodules adhere to each other partly as a result of the residual polymer in solution A. If the cast layer is allowed to dry completely, a microporous structure is obtained as shown in FIGS. 1 and 2. The porosity (i.e, pore density), pore size, and void volume (the fraction of substrate that is not occupied by the polymer) is a function of the polymer A concentration, the microcapsule dimensions and other controllable parameters, e.g. temperature, evaporation rate and others.

Three variations to the above procedures also have been developed. In a first variation, liquid B is dispersed in a solvent A which does not include a dissolved polymer. The latter is added only after an equilibration of the dispersed solution is being reached. This modification yields a better, more accurate, and "scar" free shell formation as is described by I. Cabasso, "Microcapsule For Controlled Release Via Donnan-dialysis", *Journal of Membrane Science,* Vol. 7, pp. 305–318 (1980), incorporated herein by reference.

In a second variation, a monomer or polymer reagent is dissolved in solvent B (but is not soluble in solvent A). The reagents can interact with the polymer in the droplets' boundary and thus stabilize the spherical solid shell by making it insoluble in its parent solvent A. Such method also is disclosed by I. Cabasso, *J. Membrane Science,* Vol. 7, pp. 305–318 (1980) in the process of microencapsulation by interfacial crosslinking.

A third variation involves the inclusion of interacting monomers in solutions A and B. Upon formation of the droplets, interfacial polymerization prevails, as is described in the formation of microcapsules by the interfacial polymerization.

The formation of the microcapsules is carried out with or without a dissolved polymer in phase A. However, small quantities of polymer are usually added to the casting solution in order to control and stabilize the interaction among the neighboring capsules in the nascent substrate.

EXAMPLE NOS. 1–7

100 mg fluorescein sodium salt (Fl) and 100 mg sodium chloride were dissolved in 2 ml of a 7.5% aqueous solution of polyethyleneimine (PEI). 5 ml of a 2.5% solution of 25% brominated polyphenylene oxide (PPOBr) in toluene were added. The test tube was placed in a beaker of water and the microtip of a sonicator was introduced into the test tube. The contents were sonicated for 2 minutes resulting in a stable emulsion. The emulsion was poured onto a Teflon plate, it was evenly spread by a doctor-knife to a clearance of 100 mm and allowed to evaporate in a hood. After drying for 24 hours, the film was peeled off the plate. It had an intense orange color and could not be dissolved in toluene. On introduction of the film into water some of the fluorescein and the NaCl were released immediately, another portion was released slowly during 24 hours and some remained encapsulated in the film for many days.

A series of six additional examples under the same conditions were carried out and the results thereof are summarized in Table 1. The variables were the concentrations of PEI, PPOBr, the ratio of water to toluene phases and the concentrations of Fl and NaCl. In all cases, 2 ml of the aqueous solution of PEI was used. A SEM photograph of the film obtained in Example 3 showed an asymmetric structure consisting of a thin layer with small pores and thicker porous layer under it, similar to that shown in FIG. 3.

TABLE 1

| Ex. No. | PEI concentration in water W % | Polymer in toluene solution | Polymer concentration in toluene W % | Polymer solution in toluene ml | Fl mg | NaCl mg | Evaporation Temp. °C. |
|---|---|---|---|---|---|---|---|
| 1 | 7.5 | PPOBr | 2.65 | 6 | 100 | 100 | 25 |
| 2 | 2.5 | " | 0.83 | 6 | 50 | 0 | 25 |
| 3 | 2.5 | " | 1.25 | 20 | 250 | 0 | 25 |
| 4 | 2.5 | " | 1.25 | 20 | 100 | 0 | 25 |
| 5 | 2.5 | " | 1.25 | 20 | 100 | 0 | 25 |
| 6 | 5 | " | 1.4 | 7 | 50 | 0 | 25 |
| 7 | 5 | " | 1.4 | 7 | 50 | 50 | 25 |

EXAMPLE NOS. 8–11

100 mg Fl and 100 mg NaCl were dissolved in 2 ml, 7.5% solution of PEI in water, 6 ml, 2.5% solution of PPOBr in toluene were added and the mixture was treated as in Example 1. After sonication, the emulsion was poured onto a teflon plate, some of the solvent was allowed to evaporate until the film became less fluid. It was then heated for 10 minutes at 90° C. in an air oven. After cooling off in air, the film was peeled off and treated as in Example 1. Table 2 gives all the examples including Example 8 that were carried out at 90° or 110° C. with varying concentrations of PEI, PPOBr and additives. In all these examples, 2 ml aqueous solution of PEI were used.

TABLE 2

| Ex. No. | PEI concentration in water W % | Polymer in toluene solution | Polymer concentration in toluene W % | Polymer solution in toluene ml | Fl mg | NaCl mg | Evaporation Temp. °C. |
|---|---|---|---|---|---|---|---|
| 8 | 7.5 | PPOBr | 2.5 | 6 | 100 | 100 | 90 |
| 9 | 2.5 | " | 0.83 | 6 | 100 | 100 | 110 |
| 10 | 5 | " | 1.4 | 7 | 50 | 50 | 110 |
| 11 | 5 | " | 1.4 | 7 | 50 | 0 | 110 |

EXAMPLE NOS. 12–18

100 mg Fl and 100 mg NaCl were dissolved in 2 ml 10% PEI in water. 5 ml of a 5% solution of PPOBr in toluene were added and the mixture was treated as in Example 1. A mechanically strong homogeneous orange film resulted.

A number of films were prepared under the same conditions starting with 2 ml 10% PEI and varying the concentrations of PPOBr, Fl and NaCl. These examples are presented in Table 3.

TABLE 3

| Ex. No. | PEI concentration in water W % | Polymer in toluene solution | Polymer concentration in toluene W % | Polymer solution in toluene ml | Fl mg | NaCl mg | Evaporation Temp. °C. |
|---|---|---|---|---|---|---|---|
| 12 | 10 | PPOBr | 5 | 5 | 100 | 100 | 25 |
| 13 | 10 | " | 0.71 | 7 | 50 | 50 | 25 |
| 14 | 10 | " | 1.4 | 7 | 50 | 0 | 25 |
| 15 | 10 | " | 2.9 | 6 | 50 | 50 | 25 |
| 16 | 10 | " | 2.9 | 6 | 50 | 50 | 25 |
| 17 | 10 | " | 10 | 5 | 100 | 100 | 25 |
| 18 | 10 | " | 10 | 6 | 0 | 0 | 25 |

EXAMPLE NOS. 19–22

Another series of examples using 2 ml 10% PEI were carried out under conditions similar to those of Example 8—namely, the films were dried at 110° or 90° C. in an air oven. These examples are summarized in Table 4 below.

TABLE 4

| Ex. No. | PEI concentration in water W % | Polymer in toluene solution | Polymer concentration in toluene W % | Polymer solution in toluene ml | Fl mg | NaCl mg | Evaporation Temp. °C. |
|---|---|---|---|---|---|---|---|
| 19 | 10 | PPOBr | 2.9 | 7 | 50 | 50 | 110 |
| 20 | 10 | " | 2.9 | 7 | 50 | 50 | 110 |
| 21 | 10 | " | 10 | 5 | 100 | 100 | 90 |
| 22 | 10 | " | 10 | 5 | 100 | 100 | 90 |

EXAMPLE NOS. 23-26

50 mg Fl were dissolved in 2 ml, 15% PEI in water. 6 ml of 4.3% PPOBr in toluene were added and the mixture was sonicated for 2 minutes. The emulsion was treated as in Example 1. A transparent orange film with good mechanical properties was obtained.

Three more examples were carried out with 2 ml 15% PEI. The compositions are given in Table 5. Example 11, was dried at 90° as in Example 8.

TABLE 5

| Ex. No. | PEI concentration in water W % | Polymer in toluene solution | Polymer concentration in toluene W % | Polymer solution in toluene ml | Fl mg | NaCl mg | Evaporation Temp. °C. |
|---|---|---|---|---|---|---|---|
| 23 | 15 | PPOBr | 4.3 | 6 | 50 | 0 | 25 |
| 24 | 15 | " | 4.3 | 6 | 50 | 50 | 25 |
| 25 | 15 | " | 10 | 4 | 140 | 140 | 25 |
| 26 | 15 | " | 10 | 4 | 140 | 140 | 90 |

EXAMPLE NOS. 27-32

100 mg Fl and 100 mg NaCl were dissolved in 2 ml, 10% PEI in water. 5 ml, of a 10% solution of polylactic acid (PLA) in toluene were added. The mixture was sonicated for 2 minutes and a film was cast as in Example 1.

Two more mixtures of PEI and PLA were prepared and treated as above. Polyphenylene oxide, krayton and polystyrene were also used as the organic phase polymers. These experiments are summarized in Table 6.

TABLE 6

| Ex. No. | PEI concentration in water W % | Polymer in toluene solution | Polymer concentration in toluene W % | Polymer solution in toluene ml | Fl mg | NaCl mg | Evaporation Temp. °C. |
|---|---|---|---|---|---|---|---|
| 27 | 10 | PLA | 10 | 5 | 100 | 100 | 25 |
| 28 | 2.5 | " | 1.25 | 20 | 100 | 0 | 25 |
| 29 | 10 | " | 10 | 6 | 200 | 0 | 90 |
| 30 | 10 | PPO | 10 | 6 | 200 | 0 | 90 |
| 31 | 10 | Krayton | 10 | 7 | 200 | 0 | 90 |
| 32 | 10 | PS | 10 | 6 | 200 | 0 | 90 |

EXAMPLE NOS. 33-42

100 mg Fl were dissolved in 2 ml, 2% gelatin in water 20 ml of 1.25% PPOBr in toluene, were added. The mixture was sonicated for 2 minutes and a film was cast as in Example 1.

Other mixtures of aqueous gelatin solutions and solutions of PPOBr, PLA, PPO and Krayton were also treated as above. The examples are summarized in Table 7.

TABLE 7

| Ex. No. | PEI concentration in water W % | Polymer in toluene solution | Polymer concentration in toluene W % | Polymer solution in toluene ml | Fl mg | NaCl mg | Evaporation Temp. °C. |
|---|---|---|---|---|---|---|---|
| 33 | 2 | PPOBr | 1.25 | 20 | 100 | 0 | 25 |
| 34 | 10 | " | 1.25 | 20 | 100 | 0 | 25 |
| 35 | 10 | " | 1.4 | 7 | 50 | 0 | 25 |
| 36 | 10 | " | 1.4 | 7 | 50 | 50 | 25 |
| 37 | 10 | " | 5 | 6 | 0 | 0 | 25 |

TABLE 7-continued

| Ex. No. | PEI concentration in water W % | Polymer in toluene solution | Polymer concentration in toluene W % | Polymer solution in toluene ml | Fl mg | NaCl mg | Evaporation Temp. °C. |
| --- | --- | --- | --- | --- | --- | --- | --- |
| 38 | 10 | " | 10 | 6 | 0 | 0 | 25 |
| 39 | 10 | PLA | 10 | 6 | 200 | 0 | 90 |
| 40 | 10 | " | 10 | 6 | 200 | 0 | 90 |
| 41 | 10 | PPO | 1.25 | 20 | 100 | 0 | 25 |
| 42 | 10 | Krayton | 10 | 4 | 140 | 0 | 25 |

EXAMPLE NOS. 43–45

100 mg Fl were dissolved in 2 ml 2% polyvinylpyrrolidone (PVP) in water. 6 ml, 1.25% PPOBr in toluene were added. The mixture was sonicated for 2 minutes and a film was cast as in Example 1. The film was studied with a scanning electron microscope and showed an asymmetric structure. The top layer consisted of very regular pores of about 1 m and the rest was a porous bee-hive structure.

Two more examples with PVP and PLA were carried out. The concentrations and conditions are given in Table 8.

TABLE 8

| Ex. No. | PEI concentration in water W % | Polymer in toluene solution | Polymer concentration in toluene solution W % | Polymer solution in toluene ml | Fl mg | NaCl mg | Evaporation Temp. °C. |
| --- | --- | --- | --- | --- | --- | --- | --- |
| 43 | 2 | PPOBr | 1.25 | 6 | 100 | 0 | 25 |
| 44 | 2 | PLA | 1.25 | 20 | 100 | 0 | 25 |
| 43 | 20 | " | 10 | 6 | 200 | 0 | 90 |

EXAMPLE NO. 46

100 mg Fl were dissolved in 2 ml 10% PEI in water. 6 ml 1.7% PPOBr in toluene were added and the mixture was sonicated for 2 minutes. 0.1 ml triethylamine were then added to react with the unreacted bromine on the polymer. Sonication was continued for one minute. The emulsion was poured on a glass plate and left to dry overnight. The film formed was glued to the glass and had to be scraped off with a razor blade. Small pieces of film could be isolated but the film was very brittle.

EXAMPLE NO. 47

100 mg Fl were dissolved in 2 ml 10% aqueous solution of PEI. 6 ml of a 10% PPOBr solution in toluene were added and the two phases were sonicated until a fine emulsion resulted. 0.1 ml triethylamine were then added and sonication was continued. After about 1 minute, the emulsion turned into a thick paste. It was spread on a glass plate and allowed to dry in air. A brittle red-brown solid resulted.

EXAMPLE NO. 48

100 mg Fl were dissolved in water and emulsified in 20 ml of a 1.25% PPOBr solution in toluene, by sonication for 2 minutes. The stable emulsion obtained was poured on a glass plate and allowed to dry in air. The film was studied by a scanning electron microscope and showed an asymmetric porous structure. The structure is shown in FIG. 4.

EXAMPLE NO. 49

200 mg Fl were dissolved in 2 ml water. 5 ml 10% PPOBr in toluene were added and the mixture was sonicated for 2 minutes. The emulsion was cast over a Teflon covered glass plate. Some of the solvent was allowed to evaporate until the emulsion became viscous and then it was introduced into an air even at 90° C. for 10 minutes. The film peeled off easily. A fraction of this membrane was tested for its solubility in toluene; it did not redissolve or disintegrate. Another fraction was submerged in water. Slow elution of Fl took place, but the bulk of the Fl remained in the film for days.

EXAMPLE NO. 51

100 mg Fl were dissolved in 2 ml water and sonicated for 2 minutes with 20 ml of 1.25% polyphenylene oxide (PPO) in toluene. The emulsion was cast on a glass plate and left to dry overnight. The film was scraped off the glass with a razor blade giving a thin orange film. When the film was introduced into water it released slowly some fluorescein. Some of the Fl remained encapsulated in the polymer film.

EXAMPLE NO. 52

2 ml of a 10% aqueous solution of polyvinyl alcohol containing 10 mg Fl was sonicated with 6 ml of 10% solution of polyvinyl acetate in toluene. A stable emulsion was obtained and was cast on a glass plate. A transluscent film was obtained.

EXAMPLE NO. 53

2 ml of 10% solution of polyvinyl acetate in toluene was sonicated with 6 ml of a 10% solution of polyvinyl alcohol in water. The emulsion was cast on glass and a transparent film was obtained.

EXAMPLE NO. 54

2 ml of a 10% aqueous solution of polyvinyl alcohol (20% residual acetate) was sonicated with 6 ml of 10% solution of polyvinyl acetate (20% hydrolyzed to alcohol) in toluene. A stable emulsion resulted. It was cast on a glass plate and dried overnight to yield a transparent film.

What is claimed is:

1. A method of making a microporous membrane having a preselected pore structure, the diameters of the pores being within a preselected range, the method comprising:
   a. providing a solution of polymer (A) in an organic solvent, said polymer (A) having at least about 5% by weight of one or more water-soluble groups on its polymer chain or pendant to the backbone of the polymer (A) and also having one or more functional groups capable of reacting, complexing or polymerizing with polymer (B);
   b. providing a solution of a polymer (B) in an aqueous solution which is immiscible in said organic polymer (A) solution, said polymer (B) having at least about 5% by weight of at least one functional group which can react, complex, or polymerize with polymer (A), or, said polymer (B) is capable of coagulating in the presence of polymer (A);
   c. uniformly dispersing the organic polymer (B) solution in the water-soluble polymer (A) solution to form a multiplicity of micro-spherical droplets of the polymer (A) solution enveloped by a skin composed of the product of reaction of polymers (A) and (B) or the coagulated polymer (B), said polymer (A) solution droplets being uniformly dispersed within a continuous phase comprised of said organic polymer (B) solution;
   d. evaporating the organic solvent to form a honeycomb-like structure comprised of said micro-spherical droplets uniformly dispersed within and held together by a solid continuous phase of said polymer (B); and
   e. dehydrating the honeycomb-like structure which cracks the exposed surfaces of the micro-spherical droplets and forms the microporous membrane comprised of a solid continuous phase of polymer (B) having a network of pores uniformly dispersed therein, with no overlapping pores, the pores at the surface having preselected sizes between about submicron and about 10 microns in diameter.

2. The process of claim 1 wherein said polymer (B) comprises a polymer having one or more functional groups in its polymer chain which can react with polymer (A) to form a copolymer of polymer (A) and polymer (B), the functional groups of polymer (B) selected from the group consisting of an isocyanate; a polyanhydride, and —COX, wherein X is a halide or —OM, wherein M is an alkali metal, alkylammonium of 1 to 4 carbon atoms or alkanolammonium of 1 to 4 carbon atoms.

3. The process of claim 2 wherein polymer (B) is selected from the group consisting of a brominated polyphenylene oxide, polylactic acid, chloromethylated polystyrene and polyglycol acetate.

4. The process of claim 1 where said polymer (B) comprises a polymer which coagulates and forms a precipitate in the presence of the polymer (A) solution.

5. The process of claim 4 wherein said polymer (B) is selected from the group consisting of polyphenylene oxide, polystyrene, polymethylmethacrylate, cellulose acetate, polyvinyl acetate, polycarbonate and polyvinylidene fluoride.

6. The process of claim 1 wherein said water-soluble polymer (A) has at least 5% by weight water-soluble groups on its polymer chain.

7. The process of claim 1 wherein said water-soluble polymer (A) has at least 5% by weight water-soluble groups pendent to the backbone of the polymer.

8. The process of claim 1 wherein said water-soluble groups are selected from the group consisting of amino, silicone, hydroxy, carboxy and quaternary salts.

9. The process of claim 1 wherein said water-soluble polymer (A) is selected from the group consisting of polyoxyisophthaloyl, polyethylenimine, gelatin, polyvinyl-pyrrolidone, polyvinyl pyridinium halide, amino dimethylsiloxane, polyacrylic acid, polyhydroxyethylmethylacrylate (HEMA), dextran, polyvinyl alcohol, and their copolymer derivatives.

10. The process of claim 1 wherein said functional group(s) of polymer (A) is the same as the water-soluble group(s) of polymer (A).

11. The process of claim 10 wherein said organic solvent for polymer (B) is toluene.

12. The process of claim 1 wherein said organic solvent for polymer (B) is an aromatic compound.

13. The process of claim 1 wherein said solvent for polymer (A) comprises water, methanol, or an aqueous solution of an alcohol.

14. A microporous membrane having a preselected pore structure, the diameter of the pores being within a preselected range, said membrane comprised of a solid continuous phase of polymers (A) and (B) configured to have a bee-hive morphology defining a network of pores, with no overlapping pores, the pores at the surface having preselected sizes between submicron and about 10 microns in diameter said polymer (A) having at least about 5% by weight of one or more water-soluble groups on its polymer chain or pendant to its backbone and also having one or more functional groups capable of reacting, complexing or polymerizing with polymer (B), and said polymer (B) having at least about 5% by weight of at least one functional group which can react, complex or polymerize with polymer (A), or said polymer (B) being capable of coagulating in the presence of polymer (A).

15. The membrane of claim 14 in which said membrane is comprised of polymer (A) and (B).

16. The membrane of claim 14 wherein the composite polymer (A) and (B) becomes insoluble in either a solvent for polymer (A) or a solvent for polymer (B).

17. The membrane of claim 14 wherein the membrane is asymmetric and the skin contains fairly uniform holes that can range from 0.01 micrometer to 10 micrometer in diameter with a deviation of ±50%.

18. The membrane of claim 14 wherein said polymer (B) comprises a polymer having one or more functional groups in its polymer chain which can react with polymer (A) to form a copolymer of polymer (A) and polymer (B), the functional groups of polymer (B) selected from the group consisting of an isocyanate; a polyanhydride, and —COX, wherein X is a halide or —OM, wherein M is an alkali metal, alkylammonium of 1 to 4 carbon atoms or alkanolammonium of 1 to 4 carbon atoms.

19. The membrane of claim 14 wherein said water-soluble polymer (A) is selected from the group consisting of polyoxyisophthaloyl, polyethyleneimine, polyamines, gelatin, polyvinyl-pyrrolidine, polyvinyl pyridinium halide, polyamino methylsiloxane, polyacrylic acid, polyhydroxyethylmethylacrylate (HEMA), dextran, polyvinyl alcohol, and their copolymer derivatives.

20. The membrane of claim 14 where an organic soluble polymer (A) is dispersed in a water-soluble polymer (B).

21. The membrane of claim 14 formed from a dispersion where both the dispersed and the continuous phases are in organic solvents of different polarities.

* * * * *